US010324988B2

(12) United States Patent
Bhat et al.

(10) Patent No.: US 10,324,988 B2
(45) Date of Patent: Jun. 18, 2019

(54) RESOURCE DISTRIBUTION BASED UPON SEARCH SIGNALS

(71) Applicant: AirWatch LLC, Atlanta, GA (US)

(72) Inventors: Manjunath Bhat, Bangalore (IN); Ramani Panchapakesan, Bangalore (IN); Sivasubramaniam Sivakumar, Bangalore (IN)

(73) Assignee: Airwatch LLC, Atlanta, GA (US)

( * ) Notice: Subject to any disclaimer, the term of this patent is extended or adjusted under 35 U.S.C. 154(b) by 533 days.

(21) Appl. No.: 14/548,369

(22) Filed: Nov. 20, 2014

(65) Prior Publication Data

US 2016/0092585 A1 Mar. 31, 2016

(51) Int. Cl.
G06F 16/9535 (2019.01)

(52) U.S. Cl.
CPC .............................. *G06F 16/9535* (2019.01)

(58) Field of Classification Search
CPC ..................... G06F 17/30867; G06F 16/9535
See application file for complete search history.

(56) References Cited

U.S. PATENT DOCUMENTS

| 7,792,789 B2 * | 9/2010 | Prahlad | G06F 17/30616 707/608 |
| 2007/0283410 A1 * | 12/2007 | Hsu | G06F 17/30575 726/1 |
| 2008/0059460 A1 * | 3/2008 | Lunenfeld | G06F 17/30864 |
| 2011/0029509 A1 * | 2/2011 | Kumthekar | G06F 17/30867 707/723 |
| 2011/0295875 A1 * | 12/2011 | El Daher | G06F 17/3087 707/769 |
| 2012/0215786 A1 * | 8/2012 | Abbott | G06F 17/30312 707/741 |
| 2014/0032575 A1 * | 1/2014 | Kiang | G06F 17/30442 707/754 |
| 2014/0156784 A1 * | 6/2014 | Buck | H04L 67/1095 709/217 |
| 2014/0324825 A1 * | 10/2014 | Gopinath | G06F 17/30705 707/722 |
| 2015/0172419 A1 * | 6/2015 | Toledo | H04L 67/42 709/203 |

OTHER PUBLICATIONS

U.S. Appl. No. 61/915,959, filed Dec. 13, 2013. (Year: 2013).*
U.S. Patent Application entitled "Sampling for Content Selection" filed Jun. 24, 2014, having U.S. Appl. No. 14/313,650.

* cited by examiner

*Primary Examiner* — Jay A Morrison
(74) *Attorney, Agent, or Firm* — Thomas | Horstemeyer, LLP

(57) ABSTRACT

Embodiments of the disclosure are related to distribution of content in response to search signals in an enterprise environment. Embodiments of the disclosure obtain search signals from a client device associated with a user. In response to obtaining such a search signal, content stored on a resource repository can be located. Such a resource repository can be a private repository associated with an enterprise. In response to located content, a notification can be sent to the client device of the user.

19 Claims, 6 Drawing Sheets

RESOURCE DISTRIBUTION BASED UPON SEARCH SIGNALS

CROSS-REFERENCE TO RELATED APPLICATION

This application claims priority to and the benefit of Indian Patent Application No. 1011/KOL/2014, filed Sep. 30, 2014, which is hereby incorporated herein by reference in its entirety.

BACKGROUND

Client devices, such as smartphones, tablet computers, and the like, may execute applications that perform various functions. A client device may be associated with a user account in an enterprise system or enterprise device management infrastructure. The user may also perform searches via a search engine that is accessible via a network, such as the public Internet. Additionally, the user account may also be associated with enterprise mail, calendars, contact data, or other enterprise resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure is directed towards distribution of resources from a resource repository to users in an enterprise environment. Resources can include, for example documents, media, application or any data that can be accessed by a computing device associated with a user. Users in an enterprise environment can acquire or be provided with a computing device, such as a smartphone, tablet device, a general purpose computing device, or other computing device. Such a device may be associated with a user account of the user in the enterprise environment. The device may also be equipped with various applications, such as a browser, mail application, calendar application, an application for accessing contacts, an application for accessing or browsing a resource repository, or any other type of application.

Embodiments of the present disclosure can facilitate the distribution of resources to users in an enterprise environment, where the resources are obtained from a resource repository that is, in some scenarios, a private resource repository that is associated with the enterprise. For example, such a resource repository can comprise a private resource repository or portal that provides for resource sharing among users within an enterprise. As another example, such a resource repository can also include an application distribution environment, such as an application marketplace or "app store" from which users may download applications. Such an environment may be a private application distribution environment or a public distribution environment. Another example of a resource repository can include a remote data storage service or file hosting service in which users may be assigned a storage account or storage space and in which data can be uploaded, synchronized or shared via the repository.

Embodiments of the disclosure can distribute resources from a resource repository to users of the enterprise based upon search signals that are obtained with respect to the user's activity on a client device, profile information about a user or user account data, data extracted from calendar events and/or email messages that are sent or received by the user, search queries initiated by a user via a browser executed by the client device, and other signals that can be obtained via applications executed by a client device associated with a user account. In response to obtaining such a search signal, embodiments of the disclosure can determine whether resources that are related to the search signal is available on a resource repository, such as a private enterprise resource repository, and facilitate distribution of the resources to the user via a client device of the user.

Figure 1:
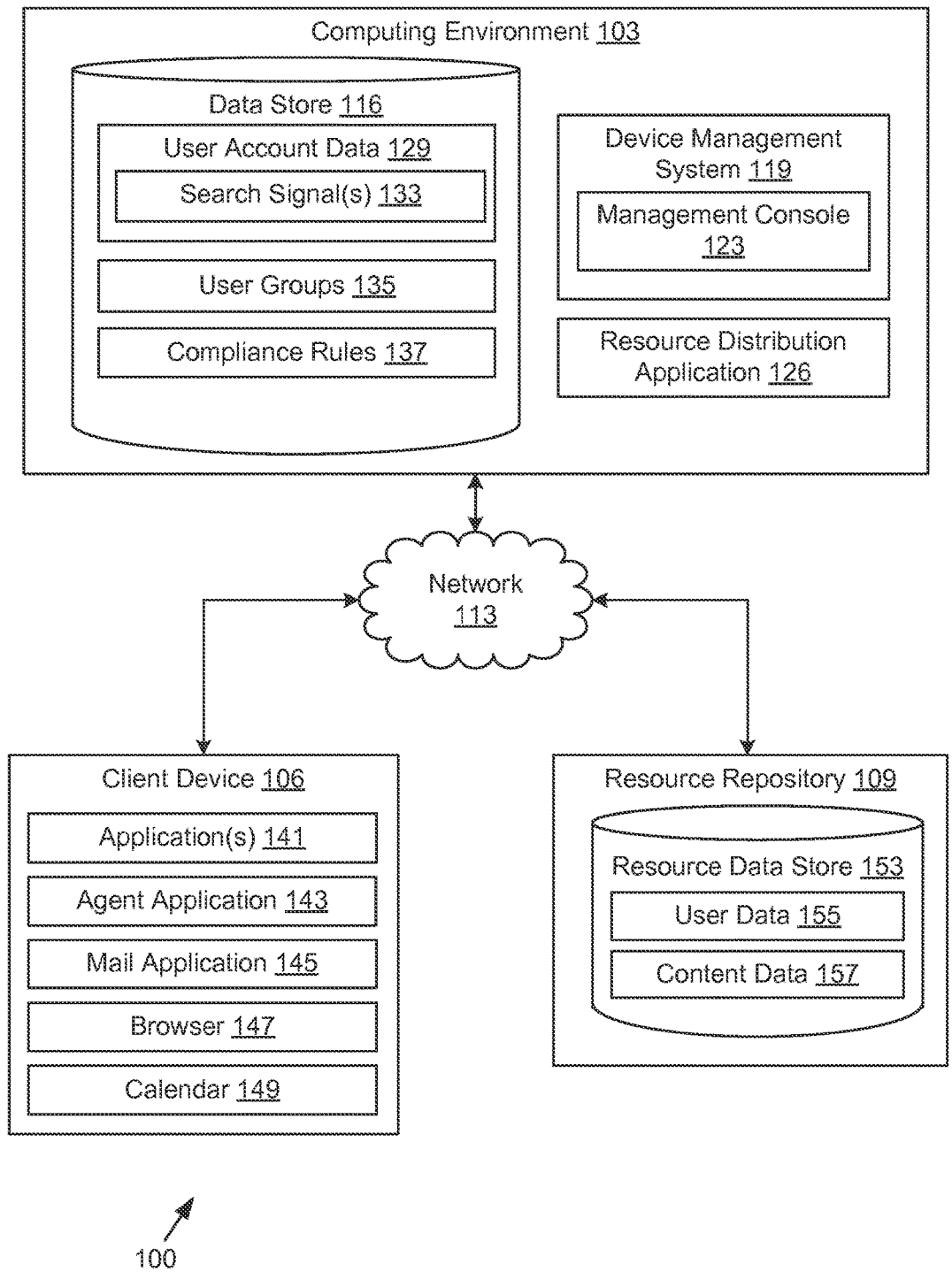
FIG. 1 is a drawing of a networked environment according to various embodiments of the present disclosure.

With reference to FIG. 1, shown is a networked environment 100 according to various embodiments. The networked environment 100 includes a computing environment 103, a client device 106, and a resource repository 109 which are in data communication with each other via a network 113. The network 113 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks.

The computing environment 103 may comprise, for example, a server computer or any other system providing computing capability. Alternatively, the computing environment 103 may employ multiple computing devices that may be arranged, for example, in one or more server banks, computer banks, or other arrangements. Such computing devices may be located in a single installation or may be distributed among many different geographical locations. For example, the computing environment 103 may include multiple computing devices that together form a hosted computing resource, a grid computing resource, and/or any other distributed computing arrangement. In some cases, the computing environment 103 may correspond to an elastic computing resource where the allotted capacity of processing, network, storage, or other computing-related resources may vary over time. The computing environment 103 may also include or correspond to one or more virtualized server instances that are created in order to execute the functionality that is described herein.

Various systems and/or other functionality may be executed in the computing environment 103 according to various embodiments. Also, various data is stored in a data store 116 that is accessible to the computing environment 103. The data store 116 may be representative of a plurality of data stores 116. The data stored in the data store 116, for example, is associated with the operation of the various systems and/or functional entities described below.

A device management system 119 and/or other systems may be executed in the computing environment 103. The device management system 119 may be executed to manage and/or oversee the operation of multiple client devices 106. For example, an employer may operate the device management system 119 to ensure that the client devices 106 of its employees are operating in compliance with various compliance rules. By ensuring that the client devices 106 of its employees are operated in compliance with the compliance rules, the employer may control and protect access to various data. The device management system 119 may also facilitate access to email, calendar data, contact information, documents, or other enterprise data to which an enterprise may wish to provide access by users via client devices 106.

In one embodiment, the device management system 119 may provide a management console 123 and/or other components. The management console 123 may facilitate an administrator's operating and control of the device management system 119. For example, the management console 123 may generate one or more user interfaces that are rendered on a display device (not shown) or accessible via a browser executed by another computing device. Such user interfaces may facilitate entering commands or other information to facilitate configuration of the device management system 119. Additionally, the user interfaces may render presentations of statistics or other information regarding the client devices 106 that are managed by the device management system 119.

The computing environment 103 may also execute a resource distribution application 126 that facilitates the distribution of resources to one or more client devices 106 associated with a user in response to search signals and/or search queries obtained by the resource distribution application 126 from client devices 106 associated with users within the enterprise. In some embodiments, the resource distribution application 126 can communicate with applications executed by a client device 106 and/or the resource repository 109 via an application programming interface (API) that is provided by the applications and/or by the resource repository 109 in which API calls can be made via the network 113. In some scenarios, the resource distribution application 126 can also push resources to a client device 106 or an application executed by the client device 106 that is configured to receive pushed resources, such as content or applications, from the resource distribution application 126. Additionally, the client device 106 can also be configured to periodically poll the resource distribution application 126 to determine whether the resource distribution application 126 has queued any resources for distribution to a particular client device 106.

The computing environment 103 may also execute other applications to facilitate interactions with a client device 106, such as an application distribution service that distributes applications and/or updates for applications to the client device 106, a mail server that provides email services and/or functionality, a document storage application that provides remote document storage capability for users of an enterprise, or other applications or services that an enterprise may deploy to provide services for its users. Description of such applications or services is not necessary for a complete understanding of embodiments of the disclosure.

The data stored in the data store 116 may include user account data 129, user groups 135, compliance rules 137, and/or other information. The user account data 129 can include data associated with a user account, such as user profile information as well as search signals 133. User profile information can include information about a user's role within an organization, an office address or location, home address or location, permissions, and/or privileges with respect to usage of an enterprise device. For example, certain users in an enterprise may be classified differently from other users. In this regard, users may be assigned to various user groups 135 within an enterprise. For example, a user group 135 may specify a worker role within a company (e.g., sales, marketing, human resources, etc.), a division within a company, a geographic location or corporate office of a company, a labor category within a company (e.g., executives, contractors, etc.), or any other attribute by which users may be grouped within an enterprise. Additionally, users may be assigned to more than one user group 135 within an enterprise.

Search signals 133 can represent search queries performed by a user via an application executed by the client device 106 as well as many other forms of data from which relevant resources can be identified by the resource distribution application 126 on behalf of the user. A search signal 133 can represent one or more terms or keywords from a calendar event on a user's calendar. A search signal 133 can also represent one or more terms or keywords from an email message via a user's enterprise mailbox. A search signal 133 may also represent data regarding other web browsing activity performed by the user via the client device 106. In some embodiments, a search signal 133 can represent an indication of interest in a particular keyword, term and/or topic. A search signal 133 can also indicate a degree of interest in a particular topic. For example, if a user searches for related topics on multiple occasions over a certain period of time, the search signal 133 stored as user account data 129 can indicate a strong interest in the topic. In other words, if a search query or search signal 133 obtained by the resource distribution application corresponds to or is similar to a previous search query or search signal 133 associated with the user, such a scenario can indicate a strong interest in the search signal 133.

User account data 129 can also include access settings such as authentication credentials, delegation settings (e.g., information about other users who may be provided access to the user account data 129 of a particular user), mail and document retention rules and/or policies, and/or other geographic access restrictions or limitations (e.g., information about certain locations and/or networks from which user account data 129 can be accessed). User account data 129 can also include information about a user account within the computing environment 103, which is referred to herein as an enterprise user account. For example, the enterprise user account may be associated with an email address or other identifier that is assigned by the computing environment 103, which may be separate or different from a personal email address or other identifier that a user may use for personal purposes. User account data 129 may further include information about a user account that a user may have within the resource repository 109, which may be an account that is external to the enterprise account.

User account data 129 can also include other account settings, such as biographical or demographic information about a user, password reset information, multi-factor authentication settings, and other data related to a user account as can be appreciated. User account data 129 can also include other forms of data associated with users of an enterprise's computing resources that are not shown, such as a user's mailbox data, calendar data, contact data, and information about the various devices, such as device identifiers, that are assigned to the user and managed in some form by the management console 123. For example, mailbox data includes data associated with one or more mailboxes corresponding to a user account of a user. The mailbox data can include electronic mail messages, mail folders into which messages are organized, filtering rules that are applied to incoming and/or outgoing mail messages, attachments associated with mail messages, and/or other data associated with a mailbox of a user.

Calendar data can include, for example, appointments, reminders, tasks, and/or other data that can be associated with a timestamp or date stamp. Calendar data can include appointments that are associated with a particular location and/or user. For example, an appointment can be linked with a particular location, meeting room, building, address, or other location. An appointment can also be linked with another user who is internal or external to an organization or domain of the user as well as with text and/or attachments. Calendar data can also include tasks, reminders, or other types of data that can be associated with a time and/or place and marked on a calendar.

Contact data can include personal information manager (PIM) or address book information related to contacts of a particular user such as internal or external email addresses, telephone contact information, mailing addresses, contact notes, and other information associated with contacts that a user may wish to maintain in an address book or contacts store. Contact data can also include user specific address book data as well as global address book data for address books that are shared among multiple users in a domain and/or enterprise. It should be appreciated that a client device 106 of a user may also be synchronized with various other forms of data other than the types of data that are discussed above and that the above examples are discussed merely for illustrative and explanatory purposes.

The user account data 129 may also include information regarding the client devices 106 that are managed by the device management system 119. For example, user account data 129 may include a device identifier that uniquely identifies one or more client devices 106 that are associated the user's account in the enterprise. Such data for a particular client device 106 may also include, for example, the identification of the particular applications that are installed in the client device 106, historical data regarding the operation of the client device 106, and/or other information.

Compliance rules 137 can be stored on the data store 113 and/or on the client device 106 and represent requirements with which a user and/or a client device 106 must comply in order to access data via the resource distribution application 126. For example, a compliance rule 137 can specify that a client device 106, in order to access mailbox data, must execute a particular version of a mail client. As another example, a compliance rule 137 may specify that in order to access data identified by the resource distribution application 126, a client device 106 must do so from within a particular geographic location and/or via a particular network. A compliance rule 137 may also specify certain time windows during a particular day, week, month or year during which a client device 106 is authorized to access data via the resource distribution application 126.

Another example of a compliance rule 137 may comprise a requirement that an operating system of the client device 106 be unmodified with respect to root access or superuser privileges available to the user. For example, certain mobile devices and/or mobile devices may be shipped with restrictions or limitations regarding root access or superuser privileges. In other words, such access may be unavailable to the user. However, certain users may employ exploits related to software and/or hardware of the client device 106 in order to gain root access or superuser privileges with respect to the client device 106. Accordingly, a compliance rule 137 specified by a network administrator may require that such a restriction or limitation on root access or superuser privileges remain in place with respect to a client device 106 in order for the client device 106 to access data via the resource distribution application 126. The agent application 143 executed by the client device 106 can determine whether such a restriction or limitation has been removed by attempting to perform one or more actions for which root access or superuser privileges are required. If the agent application 143 can perform the one or more actions, a determination can be made that the restriction or limitation has been removed.

A compliance rule 137 can specify that the client device 106 employ a certain encryption protocol or procedure. For example, a compliance rule 137 may specify that the client device 106 employ data at rest encryption for certain data stored on the client device 106. As another example, a compliance rule 137 may specify that a client device 106 and/or an application executed by the client device should periodically communicate with or "ping" the device management system 119 and/or another application or service within a specified amount of time relative to a previous communication or ping. In other words, the compliance rule 137 can specify that the client device 106 periodically "check in" with the device management system 119 or another server process.

Another compliance rule 137 may specify that the certain applications may not be installed on a client device 106 in order for the client device 106 to be permitted to access data via the resource distribution application 126. For example, certain applications may be identified as malicious applications or unauthorized applications. Accordingly, if such an application is detected to be installed on the client device 106, a compliance rule 137 may specify that such a client device 106 is not permitted to access data via the resource distribution application 126 corresponding to a particular user account or that another action should be taken. Alternatively, a compliance rule 137 may also require that one or more applications be installed on the client device 106 in order for the client device 106 to be permitted to access data via the resource distribution application 126. For example, certain applications may be identified as required applications by an administrator. Accordingly, if such an application is not detected to be installed on the client device 106, a compliance rule 137 may specify that such a client device 106 is not permitted to access data via the resource distribution application 126 or that another action should be taken.

A compliance rule 137 may also specify that if certain types of data are detected to be resident on the client device 106 or in storage accessible to the client device 106, that the client device 106 is not permitted to access data via the resource distribution application 126. For example, certain data may be identified as unauthorized data. Such unauthorized data can include, for example, music, videos, games, unencrypted data, secure documents, or any other data that can be detected as stored on the client device 106.

A compliance rule 137 may specify that a certain action should be taken when it is detected that a new subscriber identity module (SIM) card is inserted into a client device 106 relative to a previous SIM card.

A compliance rule 137 may also specify parameters with respect to password complexity, and if a password corresponding to a user fails to possess a minimum password complexity, the client device 106 is not permitted to access data via the resource distribution application 126. As another example, a compliance rule 137 may specify that data accessed via the resource distribution application 126, mailbox data, calendar data and/or contact data may not be copied and pasted to certain other applications executed by the client device 106, and if such behavior is detected, a security command can be issued to the mail client 106, the client device 106 is then no longer permitted to access data via the resource distribution application 126.

A compliance rule 137 can also specify parameters with respect to multiple devices associated with a user account. For example, a compliance rule 137 may specify that the user may authorize a maximum number of devices to access data via the resource distribution application 126, and if the user attempts to authorize more than the maximum number of devices, the client device 106 is no longer permitted to access data via the resource distribution application 126. As another example, a compliance rule 137 may specify access to data via the resource distribution application 126 should be disabled for the client device 106 if the client device 106 connects to an insecure and/or unencrypted network. A compliance rule 137 may also specify that should a particular application or functionality be launched and/or disabled by the client device 106 (e.g., a device camera, a global positioning system capability, etc.) that access to data via the resource distribution application 126 should be disabled.

Additionally, certain compliance rules 137 may be enforced depending upon the location of the client device 106. For example, certain compliance rules 137 may be triggered when the location of the client device 106 is detected to be within or outside of a certain geographic area or when the client device 106 is connected to a particular network 109. In such a scenario, the agent application 143 can report the location of the client device 106 to the device management system 119, and if a compliance rule 137 specifies that the client device 106 is not authorized to access data via the resource distribution application 126 from a particular location, access to the data can be disabled. A location property can be detected via a global positioning system or other location detection capability of the device and/or when the client device 106 is in a particular data roaming state.

Compliance with compliance rules 137 may be determined by a process executed by the client device 106, by the device management system 119, by a combination of the device management system 119 and a locally executed process, or by another process that is executed on another computing device. For example, the agent application 143 can submit a request to the device management system 119 requesting that the device management system 119 determine whether the client device 106 is in compliance with compliance rules 137. The device management system 119 can make such a determination and issue a response to the agent application 143 indicating whether the client device 106 is in compliance. Additionally, compliance may be determined by a combination of the agent application 143 and/or the device management system 119. For example, compliance with certain compliance rules 137 may be determined locally on the client device 106, while others may require or may be more efficiently determined by the device management system 119.

As referenced above, compliance rules 137 can specify actions that should be taken in response to detecting an issue with respect to a client device 106 that is potentially violating a compliance rule 137. For example, a compliance rule 137 can specify that if a particular rule is violated, that the resource distribution application 126 should distribute a notification providing information about particular resources that informs a user that the client device 106 should be brought into compliance before the resources can be accessed. As one example, if the resource distribution application 126 determines that resources should be transmitted to the client device 106 based upon a search signal, the resource distribution application 126 can transmit a notification to the client device informing the user that the content is available to the client device 106 only after the client device is brought into compliance with a violated compliance rule 137. Such a compliance rule 137 may related to a location-based parameter or a roaming state and the notification can inform the user that the resources will be available to access via the resource distribution application 126 when the device is in a location that complies with the compliance rule 137 and/or connects to a Wi-Fi network or the roaming state changes. Other examples and variations are discussed herein.

The client device 106 is representative of multiple client devices that may be coupled to the network 113. The client device 106 may comprise, for example, a processor-based system such as a computer system. Such a computer system may be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 may include a display that comprises, for example, one or more devices such as liquid crystal display (LCD) displays, gas plasma-based flat panel displays, organic light emitting diode (OLED) displays, LCD projectors or other types of display devices.

The client device 106 may be configured to execute one or more applications 141, an agent application 143, and/or other components. An application 141 may comprise, for example, one or more programs that perform various operations when executed in the client device 106. Such an operation may comprise, for example, storing data, reading data, controlling a component for the client device 106, and/or other functionality. An application 141 may perform some operations by initiating functions that are performed by an operating system in the client device 106. An application 141 may initiate operating system functions by, for example, performing API calls. The application 141 can also be configured to report usage data to the agent application 143 and/or the resource distribution application 126 from which search signals can be extracted.

The client device 106 may also execute other types of applications, such as a mail application 145, a browser 147, a calendar 149 and other applications. The depicted examples of applications executed by the client device 106 are merely exemplary and are shown for illustrative purposes.

The agent application 143 may be executed on the client device 106 to oversee, monitor, and/or manage at least a portion of the resources for the client device 106. The agent application 143 may be executed by the client device 106 automatically upon startup of the client device 106. Additionally, the agent application 143 may run as a background process in the client device 106. In other words, the agent application 143 may execute and/or run without user intervention. Additionally, the agent application 143 may communicate with the device management system 119 in order to facilitate the management of the client device 106.

The agent application 143 can manage access by the client device 106 certain resource or content, such as mailbox data, calendar data, applications or any other resources that may be accessible via the computing environment 103. In some embodiments, the agent application 143 can determine whether a client device 106 is in compliance with compliance rules 137 and report compliance to the device management system 119. The agent application 143 may also enforce compliance rules 137 on behalf of the device management system 119. For example, the device management system 119 can issue commands to the agent application 143 to delete or modify data that is stored on the client device 106 and accessible via applications 141 executed by the client device 106. The agent application 143 can also facilitate enrollment or registration of a client device 106 within the device management system 119 on behalf of a user associated with a particular user account and/or user group 135.

The resource repository 109 may comprise, for example, a server computer or any other system providing computing capability. Alternatively, the resource repository 109 may employ multiple computing devices that may be arranged, for example, in one or more server banks, computer banks, or other arrangements. Such computing devices may be located in a single installation or may be distributed among many different geographical locations.

The resource repository 109 may provide a resource data store 153 that stores various data related to resource that it may store, archive or house. In one embodiment, the resource repository 109 may comprise a resource repository 109 that facilitates the distribution and/or sale or application and other software. In another embodiment, the resource repository 109 can comprise an enterprise file sharing repository or system in which users are able to store, publish and/or share resource with other users. In some embodiments, the resource repository 109 can comprise a corporate intranet site where resource is published for retrieval by users of the enterprise.

The resource data store 153, in one embodiment, can include user data 155, resource data 157 and other data. User data 155 may include information about users of the resource repository 109. Users of the resource repository 109 may be associated with a user account or a storage account within the resource repository 109 that is separate from a user account associated with the enterprise or computing environment 103. For example, a user may be allotted storage space within the resource repository 109 for storing, synchronizing and/or publishing files to other users of the enterprise or for the user's own use. Accordingly, the user data 155 can be configured to store user profile information, payment information, or other user profile data that is related to a user account of the user within the resource repository 109.

User data 155 can indicate a storage quota for a user as well as permissions regarding other users who may be authorized to access files or other data store on behalf of the user. Resource data 157 can also include files or other data stored and made available via the resource repository 109. Resource data 157 can also include applications, media or any other type of data that is made available via a marketplace facilitated by the resource repository 109.

In some embodiments, a file can be published within the resource repository 109 and associated with multiple users of the resource repository 109 such that the file is pushed or otherwise made available to the user via the client device 106. For example, a particular file can be retrieved by the resource distribution application 126, published within the resource repository 109 by the resource distribution application 126 and subsequently associated with multiple users within the resource repository 109.

As noted above, the resource repository 109 can be configured to communicate with the resource distribution application 126 or any other system via an API provided by the resource repository 109. In one embodiment, the resource distribution application 126 can transmit an API command that instructs the resource repository 109 to transmit a file and/or a notification to a client device 106 from the resource repository 109 via such an API. In response to receiving such a command, the resource repository 109 can initiate transmission of a file or other type of resource data 157 to the client device 106.

Next, an additional description of the operation of the various components of the networked environment 100 is provided. To begin, a client device 106 can generate search signals 133, also referred to herein as search queries, that are associated with usage of the client device 106 or other enterprise resources. Search signals 133, in one embodiment, can represent a search query submitted via a browser 147 to a search engine available via a third-party website that is configured to retrieve relevant search results that are available via the public Internet. Such a search engine is unable to retrieve relevant resources from a resource repository 109 that are associated with the enterprise, as the resource repository 109 may not be accessible by the search engine. Accordingly, the browser 147 can be configured to transmit a search query entered by a user via the browser 147 to the resource distribution application 126 in addition to a search engine. As is described below, search queries or search signals can also be obtained by the resource distribution application 126 from other applications 141, such as an application 141 that facilitates browsing of a storage account associated with a particular user.

In response to receiving such a search query, the resource distribution application 126 can determine whether resources that are relevant to the search query is available as resource data 157 in the resource repository 109 independent of the search query submitted to the search engine. In other words, while the search query submitted to the search engine may yield resources relevant to the search result as determined by the search engine, the search engine does not have accessibility to the resource repository 109, which is a potentially private repository associated with the enterprise and/or another type of repository that is not indexed by or is otherwise unavailable to the search engine. For example, a user of an enterprise may be seeking resources relevant to a particular topic and documents or other types of resources pertaining to the topic may be available via the resource repository 109. In this context, relevance can be determined based upon a similarity or commonality between text that is associated with a particular query and text associated with a particular resource either as metadata or that is located within a particular resource. A search via a search engine available via the public Internet may not have accessibility to the resources stored within the resource repository 109. Accordingly, the resource distribution application 126 can identify such resources and transmit a notification to the client device 106 that contains information about such resources stored within the resource repository 109.

Such a notification from the resource distribution application 126 to the client device 106 can be transmitted to the agent application 143 or any other application executed by the client device 106. In some embodiments, a notification that content relevant to a search signal 133 is available via the resource repository 109 can include a copy of the resource data 157 that is stored within the resource repository 109. In other embodiments, such a notification can include a notification that is rendered upon a display of the client device 106 that such resources is available via the resource repository 109. In some embodiments, the resource distribution application 126 can associate the content that is relevant to the search signal 133 with a user's account within the resource repository 109, which can initiate a notification to the client device 106 with respect to the availability of the resources.

Many search engines obtain results synchronously, which means that a response that includes one or more search results is returned as a reply to a request that includes a search query, where the reply is received on the same transport connection on which the request was transmitted. The search signal 133 according to embodiments of the present disclosure may be associated with the user account of the user within the computing environment 103 and employed by the resource distribution application 126 to search for resources within the resource repository 109 that is stored within the resource repository 109 at a later point in time relative to when the search signal 133 was received from a client device 106. For example, should a search signal 133 be received at a particular point in time and should relevant resources be located within the resource repository 109 by the resource distribution application 126, the resource distribution application 126 can also periodically attempt to identify additional resources within the resource repository 109 that are stored within the resource repository 109 subsequent to when the search signal 133 was received.

As one example, if a search signal 133, such as search query submitted by a user via a browser 147 to a search engine, is received by the resource distribution application 126 and associated with the user account data 129 of the user, the resource distribution application 126 can also identify resources that are later stored within the resource repository 109 after the search signal 133 is received. In other words, the resource distribution application 126 can identify relevant resources within the resource repository 109 asynchronously with respect to when the search signal 133 is received, which can mean that a response that includes the relevant resources can be returned as a reply to the search signal 133 on a transport connection that is separate or independent from one on which the search signal 133 was transmitted.

In some scenarios, resources that are relevant to the search signal 133 may not be found by the resource distribution application 126 within the resource repository 109. In this scenario, the resource distribution application 126 can periodically attempt to locate resources relevant to the search signal 133 for a period of time after receipt of the search signal 133 and generate a notification corresponding to the resources should resources relevant to the search signal 133 later be stored within the resource repository 109. In such a scenario, the resource distribution application 126 may also generate an administrator notification that comprises a request to generate or locate resources relevant to the search signal 133. In one embodiment, the resource distribution application 126 may generate such an administrator notification after a threshold number of attempts by one or more users of the enterprise to locate resources relevant to a particular topic.

For example, the resource distribution application 126 can identify a subset of popular search signals 133 or search queries that are not associated with resources that are available via the resource repository 109. For example, if multiple users within the enterprise cause the same or similar search signals 133 to be generated, the resource distribution application 126 can generate an administrator notification informing an administrator, via a user interface generated by the management console 123, that a particular topic is popular, desired, or "trending" within an enterprise user-base. In response to such a notification, if an administrator generates, stores and/or publishes resources that are relevant to the search signal 133 in the resource repository 109, the resource distribution application 126 can generate a notification that is transmitted to the client device 106 of a user associated with the search signal 133 that such resources are now available via the resource repository 109.

The resource distribution application 126 can also generate notifications regarding resources that are relevant to a particular search signal 133 received on behalf of a particular user that are transmitted to other users within one or more of the same user groups 135 of the user. For example, if users who are members of a particular user group 135 based upon a common role or team within an enterprise and one or more of the users cause a search signal 133 to be generated that is associated with a particular topic, the resource distribution application 126 can determine if resources are related to the topic is available within the resource repository 109 and associate the resources with the user accounts of the various members of the user group 135 even if certain members of the user group 135 did not specifically take an action to cause the search signal 133 to be generated. In some embodiments, the resource distribution application 126 can avoid taking such an action unless a threshold number or percentage of a particular user group 135 cause the same or a similar search signal 133 to be generated.

The resource distribution application 126 can also generate notifications regarding resources related to a search signal 133 associated with a particular user account that take into account compliance rules 137 or which the client device 106 or a particular user may be in violation. For example, a particular compliance rule 137 may specify that should a client device 106 be in a domestic or international roaming state, that a resource notification should not include a copy of one or more files that are relevant to a particular search signal 133 and should instead inform the user of the existence of the resources within the resource repository 109 and instruct the user that the resources may only be retrieved by the user if the user connects to a Wi-Fi network or the roaming state of the client device 106 changes.

To enforce compliance rules 137 with respect to resources, prior to transmitting a resource notification with respect to available resources in the resource repository 109, the resource distribution application 126 can query the agent application 143 and/or the device management system 119 with regard to whether the client device 106 and/or the user account are in compliance with compliance rules 137 that are associated with whether the client device 106 is permitted to retrieve resources from the resource repository 109. Depending upon whether the client device 106 and/or the user account are in compliance with compliance rules 137, the resource distribution application 126 can generate an appropriate notification. For example, the resource distribution application 126 can cause resources that are identified as relevant to a search signal to be unavailable to the client device 106.

Figure 2:
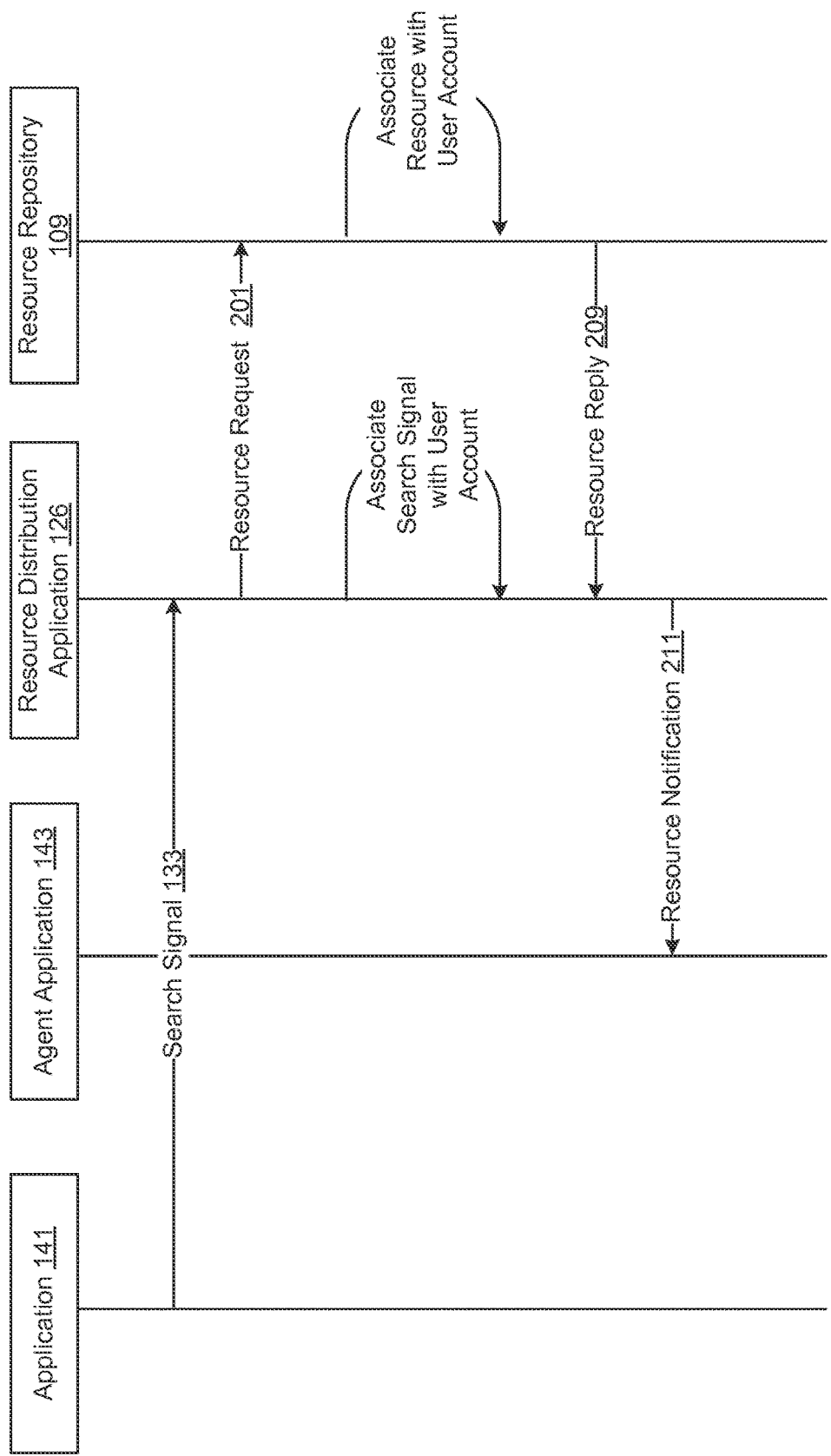
FIG. 2 is a sequence diagram illustrating an example of functionality of various components in the networked environment of FIG. 1

Referring next to FIG. 2, shown is an example sequence diagram that illustrates one example of interactions between the various components illustrated in the example networked environment 100 of FIG. 1. FIG. 2 illustrates a scenario in which a client device 106 executes an application 141 that generates a search signal 133 that is transmitted to the resource distribution application 126. It should be appreciated, as described above, that search signals 133 can be generated by various types of applications 141, such as a browser 147, a mail application 145, a calendar 149 or any other application 141 that is instrumented to communicate with the resource distribution application 126 and/or through a portal (e.g., a network firewall, load balancer, proxy server, etc.) from which the resource distribution application 126 can extract search signals 133.

As illustrated in FIG. 2, the application 141 can generate a search signal 133 that is transmitted to the resource distribution application 126. In many embodiments, the search signal 133 is generated independent of another action performed by the application 141. For example, such an action may comprise a user submission of a search query to a search engine via a browser 147. In this scenario, the browser 147 may independently transmit a search signal 133 corresponding to the search query to the resource distribution application 126. As another example, a user may send an email via a mail application 145, which may, independent of the composition or sending of the email, transmit a search signal 133 to the resource distribution application 126 that corresponds to a subject, body, addressees, sender(s) and/or other data associated with the email.

As yet another example, the calendar 149 may determine that a particular appointment or calendar event is approaching based upon a current time. In response, to such a determination, a search signal 133 can be generated that corresponds to a description of the event, meeting attendees, or other resources associated with the calendar event. Accordingly, it should be appreciated that a search signal 133 can be obtained from various types of applications 141 and be based on various types of events that may occur with respect to execution of the application.

As another example, the agent application 143 or any other application 141 may detect that a location of the client device 106 is approaching or is within a certain geographic region, or a geofence. Accordingly, the location of the client device 106 can be reported to the resource distribution application 126, which can determine whether resources are stored by the resource repository 109 that are relevant to the location of the client device 106 that can be made available to the client device 106. In other words, the location of the client device 106 can be another type of a search signal.

Upon receiving the search signal 133 from the client device 106, the resource distribution application 126 can determine whether resources relevant to the resource request 201 are stored within the resource repository 109. In other words, the resource distribution application 126 can transmit a resource request 201 comprising the search signal 133 to the resource repository 109. The resource distribution application 126 can also associate the search signal 133 with the user account corresponding to the client device 106. The resource request 201 can also instruct the resource repository 109 to associate the resources related to the search signal 133 with a user account within the resource repository 109. The resource distribution application 126 can obtain a resource reply 209 from the resource repository 109 in response to the resource request 201. The resource reply 209 can include an indication of whether resources relevant to the search signal 133 are located within the resource repository 109 as well as a reference to the content relevant to the search signal 133. Such a reference may include a copy of one or more files or documents, unique identifiers, file identifiers, hyperlinks, or other reference to resources relevant to the search signal 133. In response to identifying resources relevant to the search signal 133, the resource distribution application 126 can then transmit a corresponding resource notification 211 to the agent application 143, which can facilitate rendering of the notification by the client device 106. In some embodiments, the resource notification 211 may comprise a push notification that is transmitted to the client device 106 via an operating system API.

Figure 3:
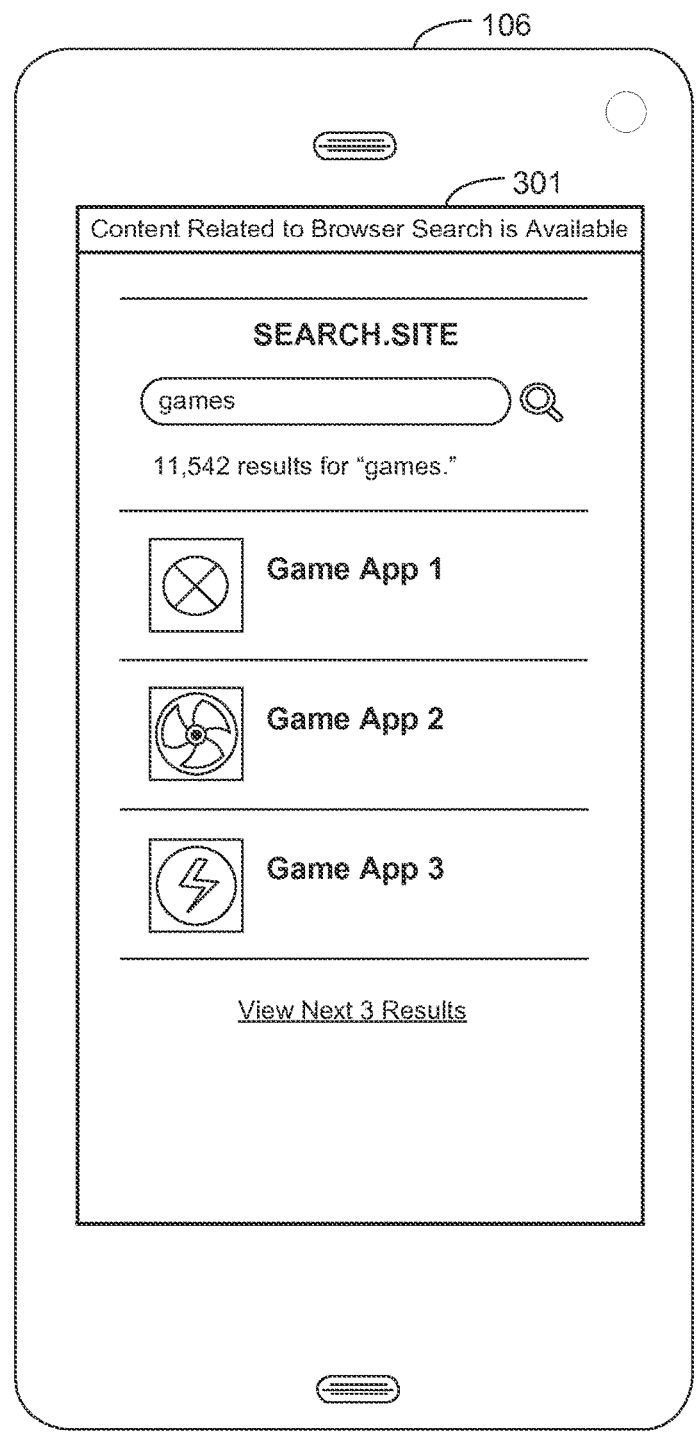
FIGS. 3-4 are example user interfaces rendered by a client device associated with various embodiments of the present disclosure.

Reference is now made to FIG. 3, which illustrates an example user interface that can be rendered by a client device 106 according to various embodiments of the disclosure. The example of FIG. 3 illustrates a user interface generated by an application 141, such as a browser 147 or any other application 141 from which a search signal 133 can be extracted or obtained. As shown in the example of FIG. 3, a notification 301 can be displayed in response to a search signal 133 that corresponds to a search query submitted by the user via the browser 147.

In the depicted example, the notification 301 includes information about resources that are relevant or related to the search signal 133. In some embodiments, the resource distribution application 126 can distribute a copy of the resources, such as one or more documents, an application, or other resources related to the search signal, to the client device 106. In other embodiments, the notification 301 can provide a mechanism by which a user may retrieve the resources from the resource repository 109, such as a hyperlink, user interface widget, or other identifier through which the resources may be accessed. As noted above, the notification 301 is transmitted to the client device 106 independent of the search query that is submitted to the search engine via the browser 147.

Figure 4:
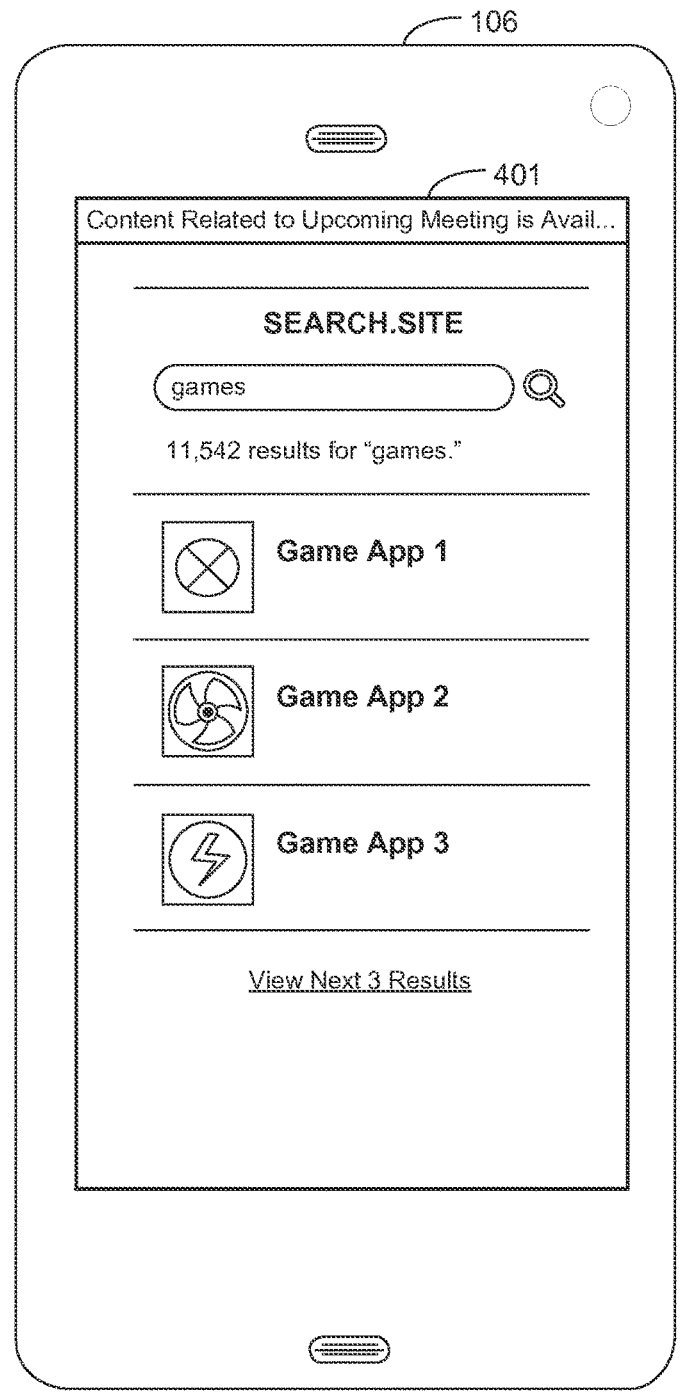

Continuing the example of FIG. 3, reference is now made to FIG. 4, which illustrates an example of an alternative user interface rendered in a client device 106. The example of FIG. 4 illustrates a user interface generated by an application 141, such as a browser 147 or any other application 141 from which a search signal 133 can be extracted or obtained. As shown in the example of FIG. 3, a notification 401 can be displayed in response to a search signal 133 that is may be unrelated to activity occurring within an application 141 being executed by the user. In the example shown in FIG. 4, the notification relates to resources associated with an upcoming event or meeting that appears on a user's calendar. As noted above, the resource distribution application 126 can associate a search signal 133 with a user account 127 of a user and obtain resources from the resource repository 109 that may be generated, stored and/or published within the resource repository 109 subsequent to when the search signal 133 is received from the client device 106.

Figure 5:
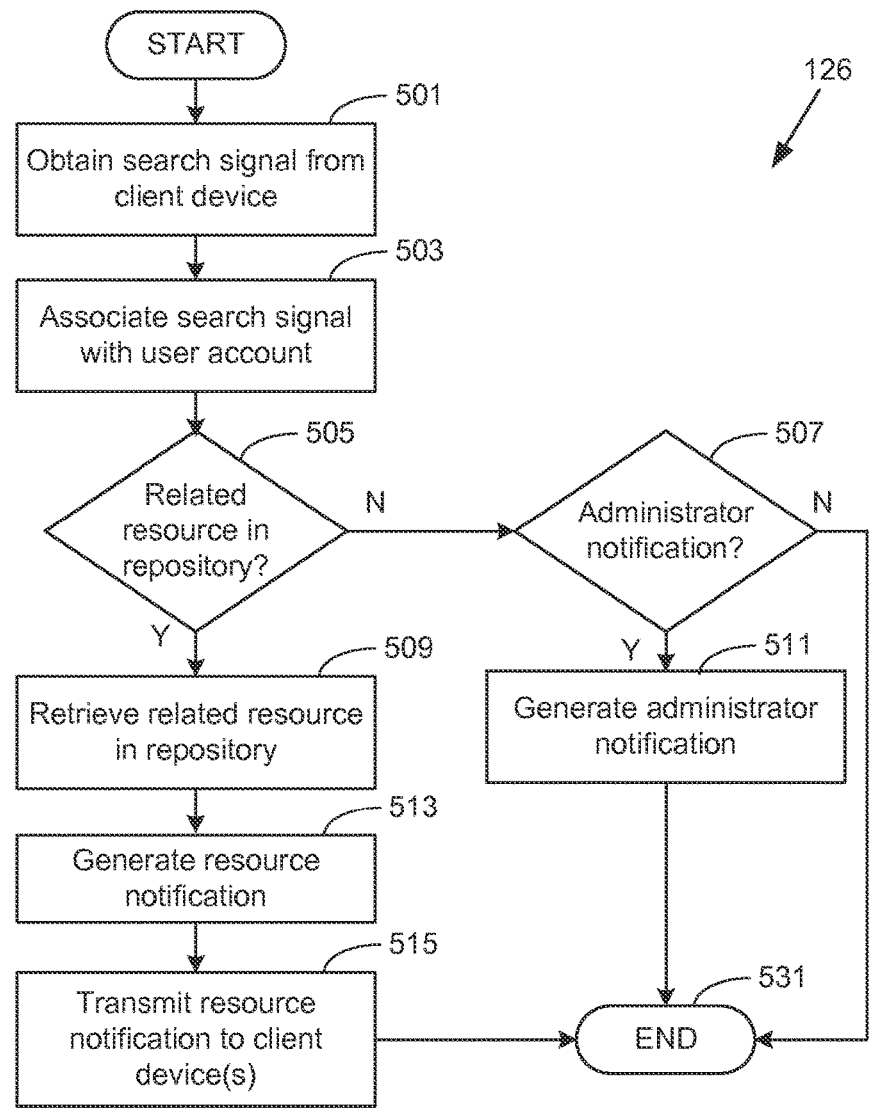
FIG. 5 is a flowchart illustrating one example of functionality implemented as portions of the resource distribution application executed in a computing environment in the networked environment of FIG. 1 according to various embodiments of the present disclosure.

Referring next to FIG. 5, shown is a flowchart that provides one example of the operation of a portion of the resource distribution application 126 according to various embodiments. It is understood that the flowchart of FIG. 5 provides merely an example of the many different types of functional arrangements that may be employed to implement the operation of the portion of the resource distribution application 126 as described herein. As an alternative, the flowchart of FIG. 5 may be viewed as depicting an example of elements of a method implemented in the client device 106 (FIG. 1) according to one or more embodiments.

Beginning with box 501, the resource distribution application 126 can obtain a search signal from a client device 106. As noted above, the search signal 133 can be generated by applications 141 executed by the client device 106 and corresponds to various forms of user activity, such as a search query submitted to a search engine, activity related to emails that are sent or received by the user, calendar event data, a current location of the client device 106, or any other user activity with respect to the client device 106. At box 503, the resource distribution application 126 can associate the search signal 133 with the user account data 129 corresponding to the client device 106.

At box 505, the resource distribution application 126 can determine whether resources related to the search signal 133 is stored within the resource repository 109. If there is none, then at box 507, the resource distribution application 126 determines whether an administrator notification that prompts an administrator user to obtain, generate and/or publish resources related to the search signal 133 within the resource repository 109 should be generated. Such an administrator notification can be generated in response to the resource distribution application 126 receiving a threshold number of search signals 133 from a particular user and/or multiple users within a user group 135 or an enterprise that are the same or similar to one another. If it is determined that an administrator notification should be generated, then at box 511, the resource distribution application 126 can generate such a notification. In some embodiments, if no content is identified, the resource distribution application 126 can also notify a user associated with the search signal via a notification transmitted to the client device 106 as well as initiate a search via a search engine for content that can be housed within the resource repository 109 that is relevant to the search signal.

If, at box 505, the resource distribution application 126 identifies resources that are related to the search signal 133 within the resource repository 109, then at box 509, the resource distribution application 126 retrieves the resources from the resource repository 109. At box 513, the resource distribution application 126 can then generate a resource notification corresponding to the resources within the resource repository 109. At box 515, the resource distribution application 126 can transmit the generated resource notification to one or more client device 106 associated with the user. As noted above, in some embodiments, the resource notification can be transmitted to multiple users associated with a user group 135 corresponding to the user from which the search signal 133 is obtained. Thereafter, the process shown in FIG. 5 proceeds to completion at box 531.

Figure 6:
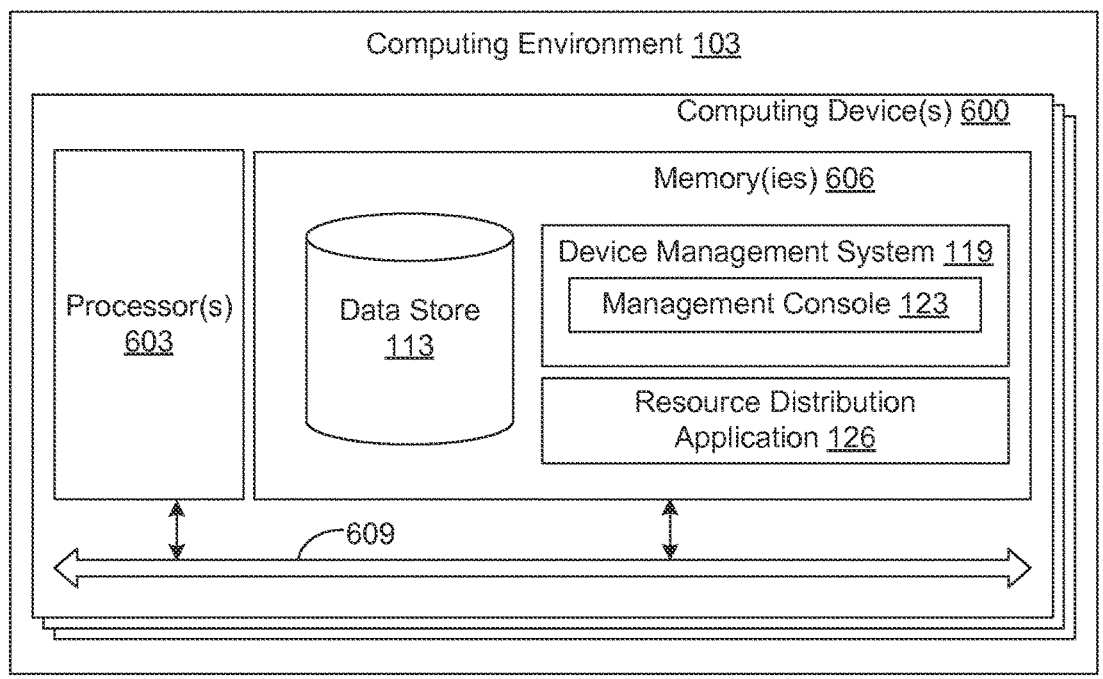
FIG. 6 is a schematic block diagram that provides one example illustration of a computing environment employed in the networked environment of FIG. 1 according to various embodiments of the present disclosure.

With reference to FIG. 6, shown is a schematic block diagram of the computing environment 103 according to an embodiment of the present disclosure. The computing environment 103 includes one or more computing devices 600. Each computing device 600 includes at least one processor circuit, for example, having a processor 603 and a memory 606, both of which are coupled to a local interface 609. As such, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the remote mail server 115, and potentially other applications. Also stored in the memory 606 may be a data store 116 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the device management system 119, management console 123, resource distribution application 126, and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows an example of the functionality and operation of an implementation of portions of the resource distribution application 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more successive blocks shown in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the resource distribution application 126, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM), dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the resource distribution application 126, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600 and/or client device 106, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in a computing device, the program code being configured to cause the computing device to at least:
  obtain, in an application executed independently of a search engine, a search query from a browser executed by a client device associated with a user account, wherein the search engine is unable to access a private repository accessible to the application that is not indexable by the search engine and associated with an enterprise, and the browser is configured to separately submit the search query to the search engine and the application, the user account being associated with at least one of a plurality of groups of users within the enterprise;
  identify, independent of a plurality of search results returned to the browser by the search engine in response to the search query and asynchronously with respect to generating of the plurality of search results by the search engine, at least one content item stored in the private repository that is relevant to the search query;
  associate the at least one content item with the user account in the enterprise;
  generate a notification that the at least one content item is available to the user account;
  transmit the notification to the client device associated with the user account;
  obtain a request to deliver the at least one content item to the client device; and transmit the at least one content item to the client device in response to the request to deliver the at least one content item.

2. The non-transitory computer-readable medium of claim 1, the program code being further configured to cause the computing device to at least:
identify a plurality of search queries obtained from a plurality of user accounts associated with the enterprise;
determine that a threshold number of the plurality of search queries correspond to the search query; and
generate an administrator notification to obtain or generate content corresponding to the search query in response to the threshold number of the plurality of search queries corresponding to the search query.

3. The non-transitory computer-readable medium of claim 1, the program code being further configured to cause the computing device to at least:
identify a plurality of search queries obtained from a plurality of user accounts associated with the enterprise;
identify a highest ranked subset of the plurality of search queries; and
generate an administrator notification to obtain or generate content corresponding to the highest ranked subset of the plurality of search queries.

4. The non-transitory computer-readable medium of claim 1, the program code being further configured to cause the computing device to at least:
determine whether the search query corresponds to a previous search query associated with the user account; and
generate an administrator notification to obtain or generate content corresponding to the search query.

5. The non-transitory computer-readable medium of claim 1, wherein the program code identifies the at least one content item stored on the private repository that is relevant to the search query based at least in part upon at least one of a device type or a role within the enterprise of a user associated with the user account.

6. A system, comprising:
at least one computing device;
programming code executable in the at least one computing device, the programming code being configured to cause the at least one computing device to at least:
obtain, in an application executed independently of a search engine, a search query from a browser associated with a user account, wherein the search engine is unable to access a private repository accessible to the application that is not indexable by the search engine and associated with an enterprise, and the browser is configured to submit the search query to the search engine and the application, the user account being associated with at least one client device, the user account being associated with at least one of a plurality of groups of users within the enterprise;
identify, independent of a plurality of search results returned to a browser executed by the at least one client device by the search engine in response to the search query and asynchronously with respect to generating the plurality of search results by the search engine, at least one content item stored in the private repository that is relevant to the search query;
associate the at least one content item with the user account;

generate a notification comprising a reference to the at least one content item; and
transmit the notification to the at least one client device independent of the search engine accessible by the browser.

7. The system of claim 6, wherein the programming code that generates the notification is further configured to cause the at least one computing device to at least transmit the at least one content item to the client device.

8. The system of claim 7, wherein the programming code that generates the notification is further configured to cause the at least one computing device to at least:
determine whether the client device is out of compliance with at least one compliance rule; and
include information about the at least one compliance rule into the notification.

9. The system of claim 6, wherein the programming code is further configured to cause the at least one computing device to at least:
identify the at least one content item subsequent to a search performed via the search engine accessible by the browser; and
transmit the notification to another application executed by the client device subsequent to the search performed via the search engine accessible by the browser.

10. The system of claim 6, wherein the search query is based at least in part upon content associated with an email message accessible via a mail client executed by the client device.

11. The system of claim 6, wherein the search query is based at least in part upon content associated with a calendar event associated with a calendar associated with the user account.

12. The system of claim 6, wherein the at least one content item is stored in the private repository and accessible using credentials associated with the user account.

13. The system of claim 12, wherein the private repository comprises an application distribution environment.

14. The system of claim 12, wherein the private repository includes a storage space associated with the user account.

15. A method, comprising:
obtaining, in an application executed independently of a search engine, a search signal from a client device associated with a user account, wherein the search engine is unable to access a private repository accessible to the application that is not indexable by the search engine and associated with an enterprise, and the browser is configured to submit the search query to the search engine and the application, the search signal obtained from a browser executed by the client device, the user account being associated with at least one of a plurality of groups of users within the enterprise;
identifying, independent of a plurality of search results returned to the browser by the search engine in response to the search signal and asynchronously with respect to generating of the plurality of search results, at least one content item relevant to the search signal in the private;
associating, by the application, the at least one content item with the user account;
generating, by the application, a notification comprising a reference to the at least one content item; and
transmitting, from the client device, the notification to the client device independent of the search engine accessible by the browser.

16. The method of claim 15, wherein the search signal comprises a user group to which the user account is associated within the enterprise.

17. The method of claim 15, wherein the search signal comprises at least one of a device type or a location of the client device.

18. The method of claim 15, wherein the search signal comprises a search query obtained on behalf of another user account within the enterprise that is associated with a same user group as the user account.

19. The method of claim 18, wherein transmitting the notification to the client device further comprises transmitting, from the at least one computing device, the notification to a plurality of client devices associated with a respective plurality of user accounts associated with the same user group as the user account.

* * * * *